(12) United States Patent
Hsieh et al.

(10) Patent No.: US 7,876,321 B2
(45) Date of Patent: Jan. 25, 2011

(54) METHOD CAPABLE OF AUTOMATICALLY TRANSFORMING 2D IMAGE INTO 3D IMAGE

(75) Inventors: Tung-Lin Hsieh, Tao Yuan Shien (TW); Wan-Ching Lee, Taipei Shien (TW); I-Ming Huang, Taipei Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 853 days.

(21) Appl. No.: 11/878,387

(22) Filed: Jul. 24, 2007

(65) Prior Publication Data
US 2008/0143716 A1 Jun. 19, 2008

(30) Foreign Application Priority Data
Dec. 15, 2006 (TW) .............................. 95147234 A

(51) Int. Cl.
*G06T 15/40* (2006.01)
(52) U.S. Cl. ..................... 345/422; 345/419; 345/420; 345/427; 382/133; 382/285
(58) Field of Classification Search ................ 345/419, 345/420, 422, 427
See application file for complete search history.

(56) References Cited

U.S. PATENT DOCUMENTS

| 6,434,277 | B1 * | 8/2002 | Yamada et al. | 382/285 |
| 6,515,659 | B1 * | 2/2003 | Kaye et al. | 345/419 |
| 6,590,573 | B1 * | 7/2003 | Geshwind | 345/419 |
| 7,102,633 | B2 * | 9/2006 | Kaye et al. | 345/419 |
| 2008/0246759 | A1 * | 10/2008 | Summers | 345/420 |

\* cited by examiner

*Primary Examiner*—Kimbinh T Nguyen
(74) *Attorney, Agent, or Firm*—Thomas, Kayden, Horstemeyer & Risley

(57) ABSTRACT

The invention discloses a method for the transforming of a 2D image into a 3D image. The method comprises the steps of: (a) selecting an object of 2D image; (b) setting a base line in the 2D image; (c) base on the base line, judging whether the object is located on the foreground or background of the 2D image; (d) offering a displacement to the object; (e) moving the object with the displacement to generate a plurality of continuous images; and (f) sequentially outputting each of the continuous images to generate the 3D image. Accordingly, after the user selects an object of 2D image, the method of the invention will automatically transform the 2D image into the 3D image.

11 Claims, 19 Drawing Sheets

METHOD CAPABLE OF AUTOMATICALLY TRANSFORMING 2D IMAGE INTO 3D IMAGE

BACKGROUND OF THE INVENTION

1. Field of the Invention

The invention relates to an image transforming method and, more particularly, to a method capable of automatically transforming a 2D image into a 3D image.

2. Description of the Prior Art

In general, a 3D image is formed by combining two sets of image data in different visual angles, wherein one set of image data corresponds to left-eye visual angle, and the other set of image data corresponds to right-eye visual angle. When a 3D image is displayed, the left eye of a viewer merely sees the image data corresponding to left-eye visual angle, and the right eye of the viewer merely sees the image data corresponding to right-eye visual angle. Accordingly, a stereoscopic vision is generated in the brain of the viewer.

In the prior art, when a user wants to transform a 2D image into a 3D image, at least one object in the 2D image needs to be selected. Afterward, the user himself judges whether the selected object belongs to a foreground or a background of the 2D image. Afterward, the user himself decides how much depth of field should be offered. If more than two objects are selected, the user needs to adjust each object respectively with the foregoing steps. It is very inconvenient for the user.

Therefore, scopes of the invention are to provide a method capable of automatically transforming a 2D image into a 3D image to solve the foregoing problems.

SUMMARY OF THE INVENTION

A scope of the invention is to provide an image transforming method, where after a user selects a 2D image object that needs to be transformed into an object of a 3D image, the invention is capable of automatically judging whether each selected object belongs to a foreground or a background, and automatically offering each object a corresponding depth of field, so as to form a 3D image.

According to a preferred embodiment, the method of the invention for transforming a 2D image into a 3D image comprises the following steps. First, in a 2D image, at least one object is selected and a base line is set. Afterward, based on the base line, whether each object belongs to the foreground or background of the 2D image is being judged, wherein N first objects are located on the foreground and M second objects are located on the background, where N and M are integers greater than or equal to zero, but both can not equal to zero at the same time. Afterward, each of the N first objects and each of the M second objects are sorted respectively, and according to the sort of the N first objects, a first displacement is offered to each of the N first objects respectively, and according to the sort of the M second objects, a second displacement is offered to each of the M second objects respectively. Each of the N first objects is moved with the first displacement and each of the M second objects is moved with the second displacement, so as to generate T continuous images, where T is a natural number. Finally, each of the T continuous images is sequentially outputted to generate a 3D image.

Accordingly, after a user selects objects of 2D image, the method of the invention is capable of automatically transforming these 2D images to 3D images. It is very convenient for the users.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
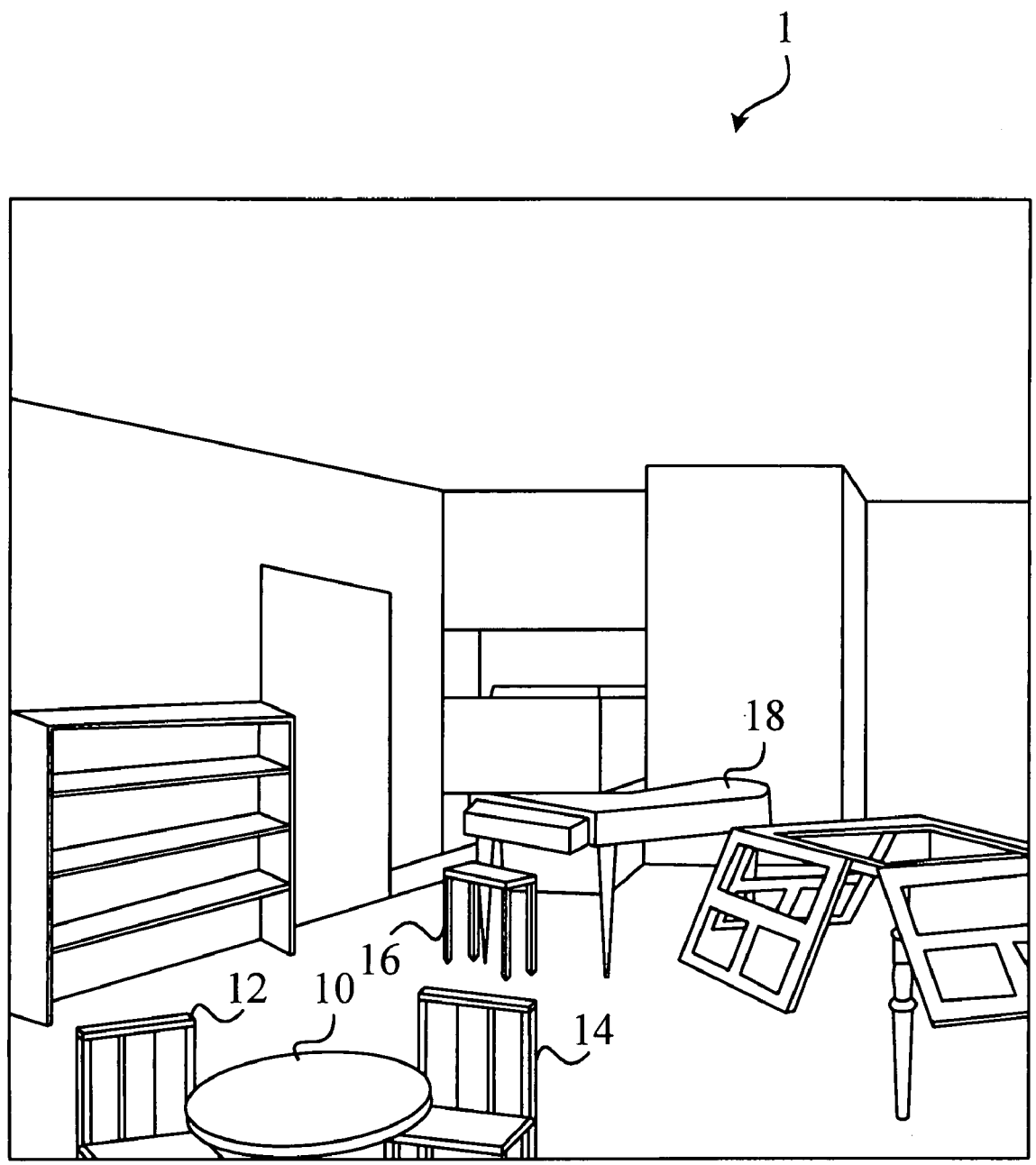
FIG. 1 is a schematic diagram illustrating a 2D image.

The method of the invention is for the transforming of a 2D image into a 3D image. Please refer to FIG. 1. FIG. 1 is a schematic diagram illustrating a 2D image 1. As shown in FIG. 1, the 2D image 1 comprises a plurality of objects, such as a table 10, chairs 12, 14, 16, a piano 18, and the like. The used technique and effects thereof for achieving the scopes of the invention are illustrated by several following preferred embodiments.

First Preferred Embodiment

The first preferred embodiment illustrates the principle of the image transforming method of the invention for transforming the table 10 in the 2D image into a 3D image.

Figure 2:
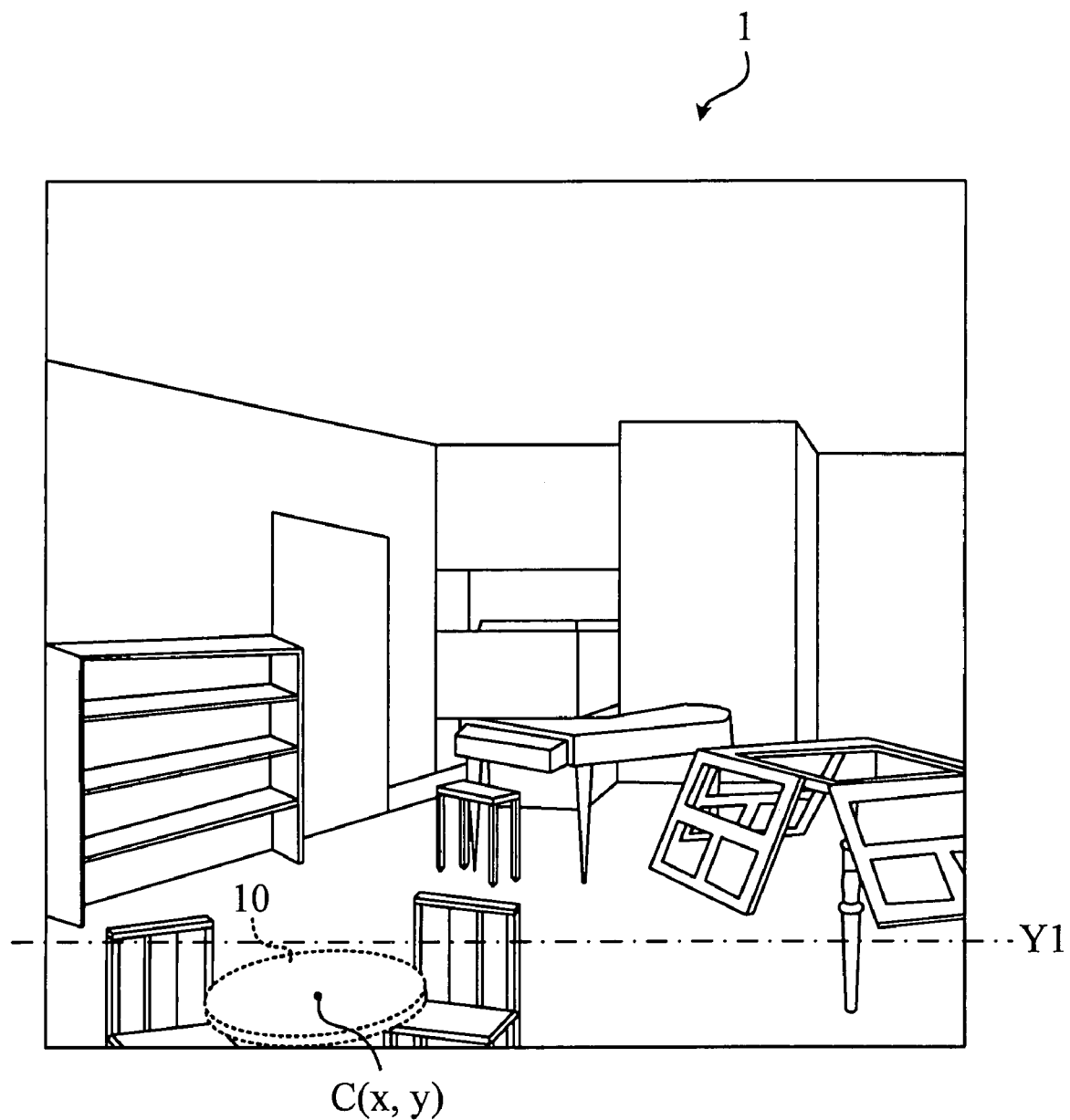
FIG. 2 is a schematic diagram illustrating that a table shown in FIG. 1 is selected.
Figure 3A:
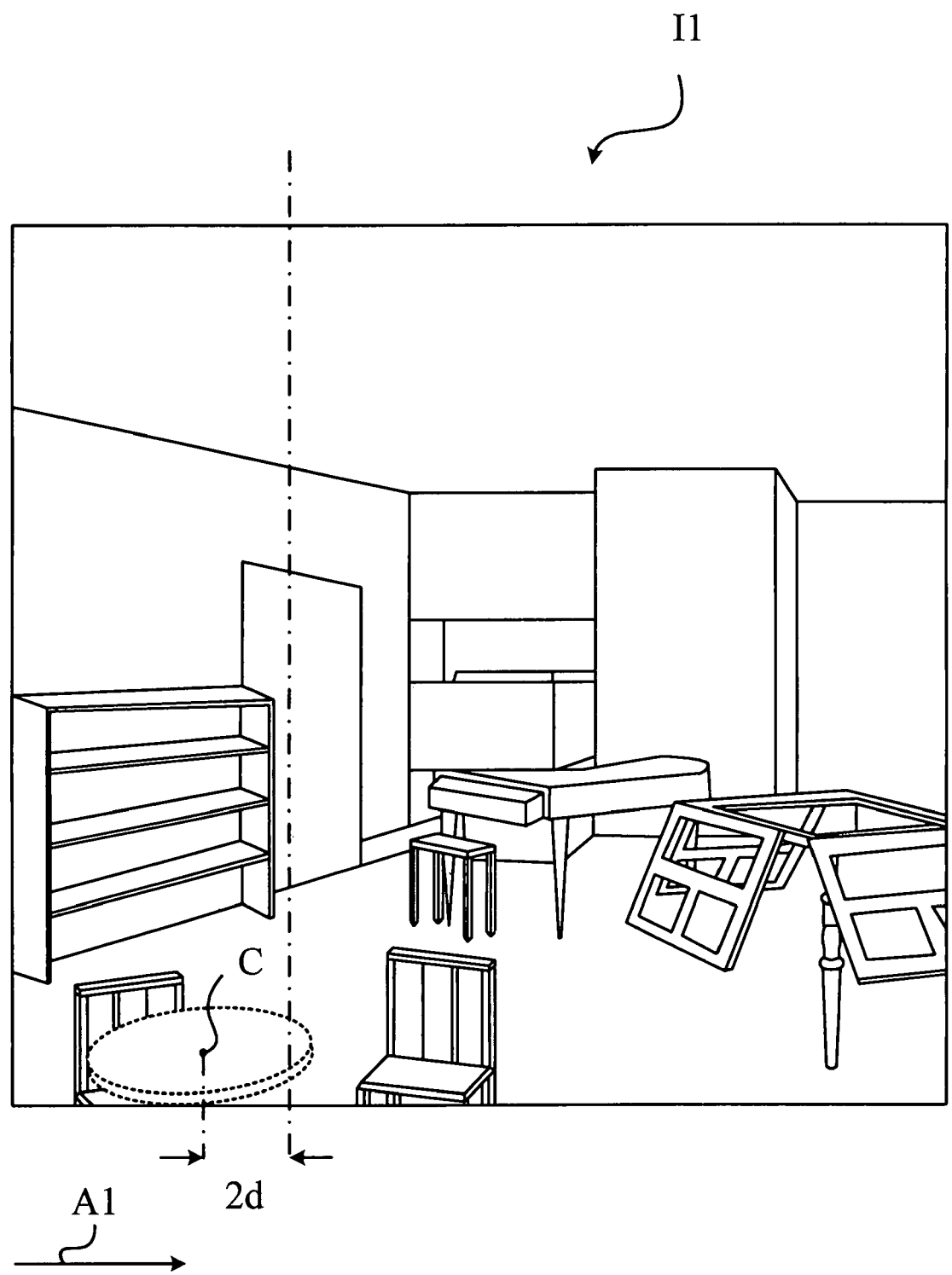
FIG. 3A to FIG. 3E are schematic diagrams illustrating five continuous images related to the table shown in FIG. 2.
Figure 3B:
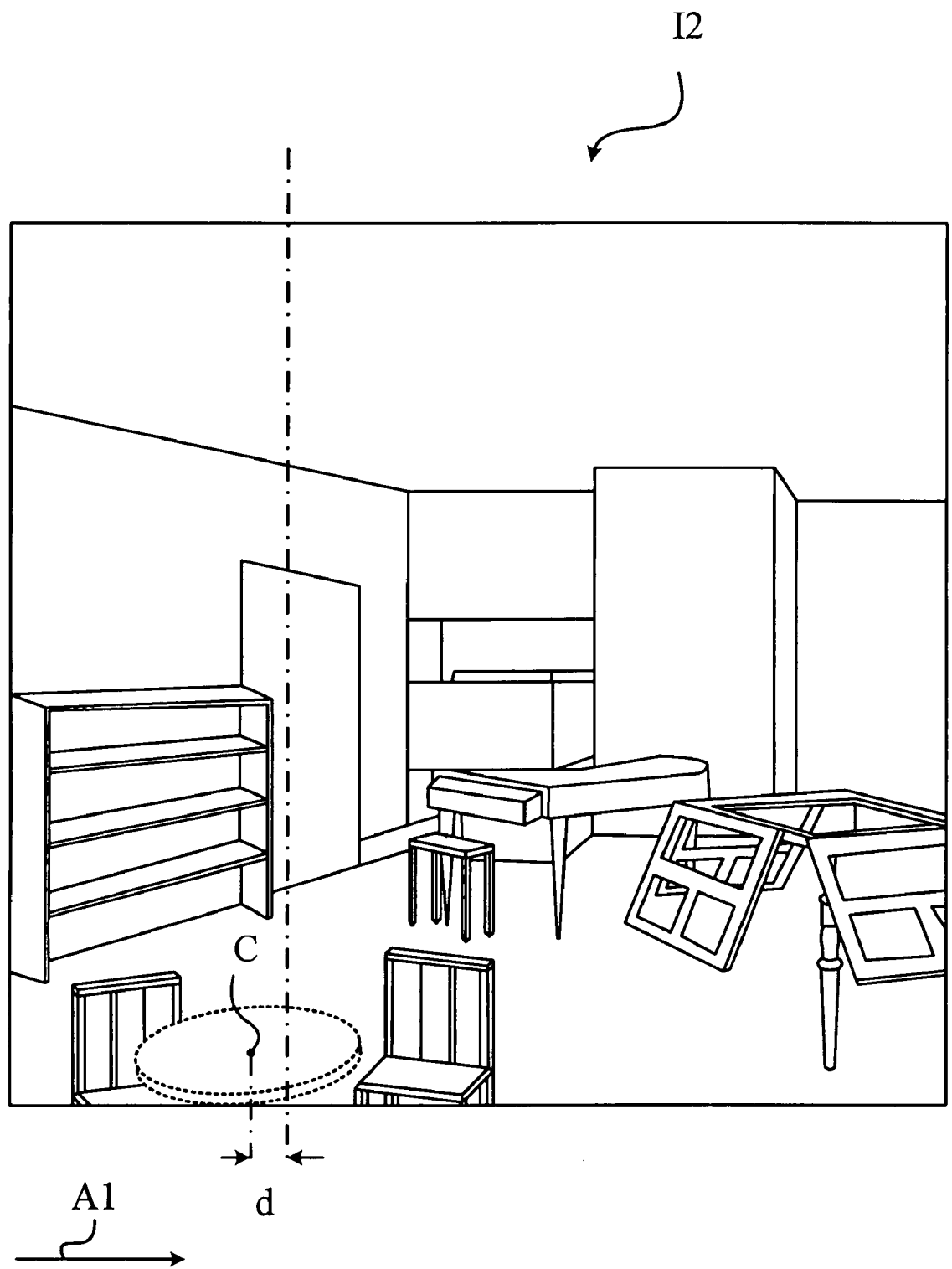
Figure 3C:
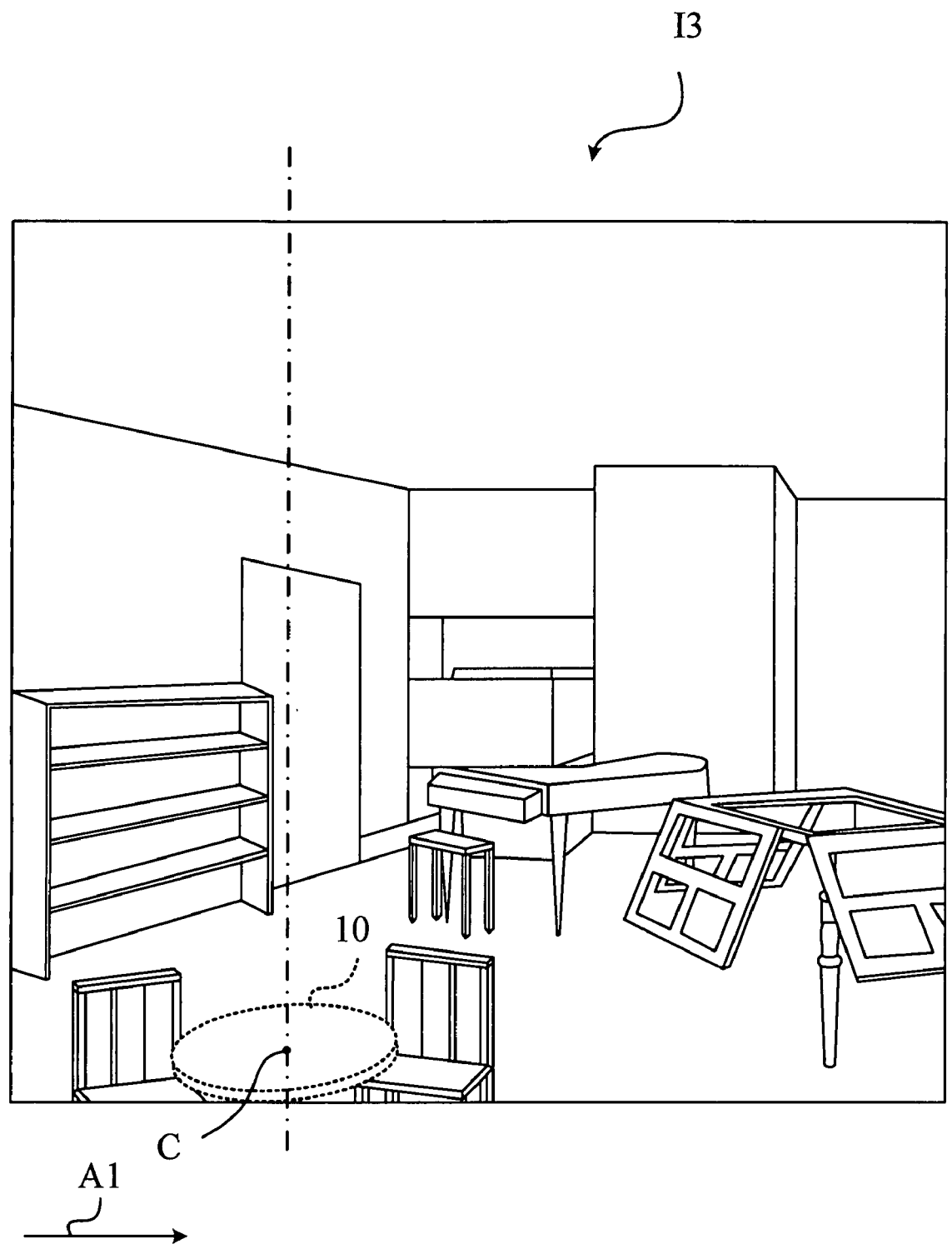
Figure 3D:
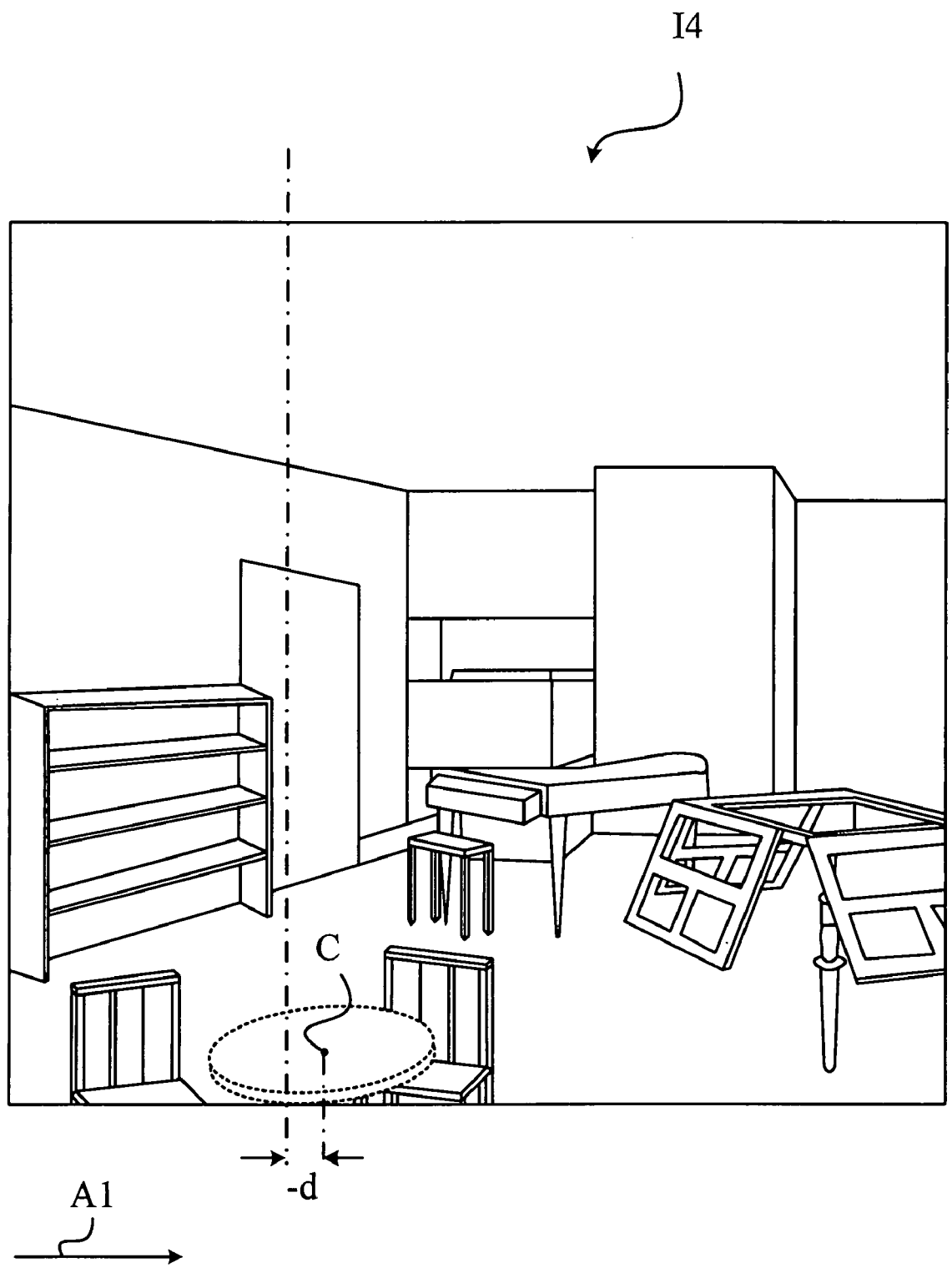
Figure 3E:
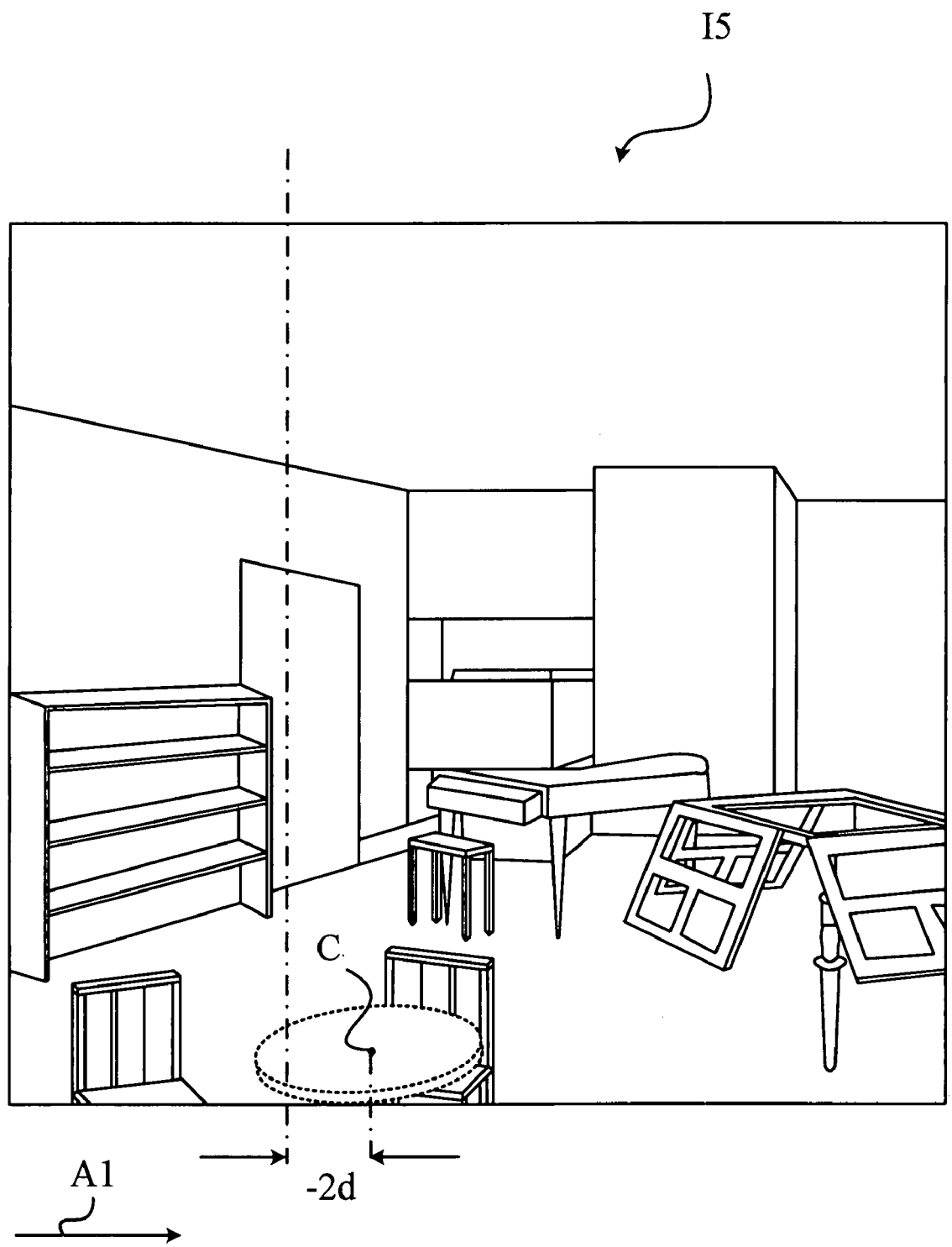

Please refer to FIG. 1 to FIG. 3E. FIG. 2 is a schematic diagram illustrating that the table 10 shown in FIG. 1 is selected, and FIG. 3A to FIG. 3E are schematic diagrams illustrating five continuous images related to the table 10 shown in FIG. 2.

In this embodiment, first, a user needs to select the table 10 (shown by dotted lines) and sets a base line Y1 in the 2D image 1. In this embodiment, the base line Y1 is a horizontal line.

Afterward, a center coordinate C(x, y) of the table 10 is calculated, and according to a position of the center coordinate C(x, y) relative to the base line Y1, whether the table 10 is located on a foreground or a background of the 2D image 1 is being judged. As shown in FIG. 2, because the y-coordinate of the center coordinate C is located below the base line Y1, it is judged that the table 10 is located on the foreground of the 2D image 1. In this embodiment, the center coordinate C(x, y) is calculated with the following formula.

$$C(x,y)=(\text{sum}(x)/n,\text{sum}(y)/n). \quad \text{Formula 1}$$

In the formula 1, n represents the amount of all pixels of the table 10, and sum(x) represents the sum of x-coordinate of each pixel and sum(y) represents the sum of y-coordinate of each pixel.

Afterward, a displacement d is offered to the table 10, and according to the center coordinate C of the table 10, the table 10 is moved sequentially along a first direction (as the direction of arrow A1 shown in FIG. 3A to FIG. 3E) with the displacement d for five times, so as to generate five continuous images I1-I5, as shown in FIG. 3A to FIG. 3E. Finally, each of the continuous images I1-I5 is outputted sequentially to generate a 3D image of the table 10.

Second Preferred Embodiment

The second preferred embodiment illustrates the principle of the image transforming method of the invention for transforming the 2D images of table 10 and chair 12 into 3D images.

Figure 4:
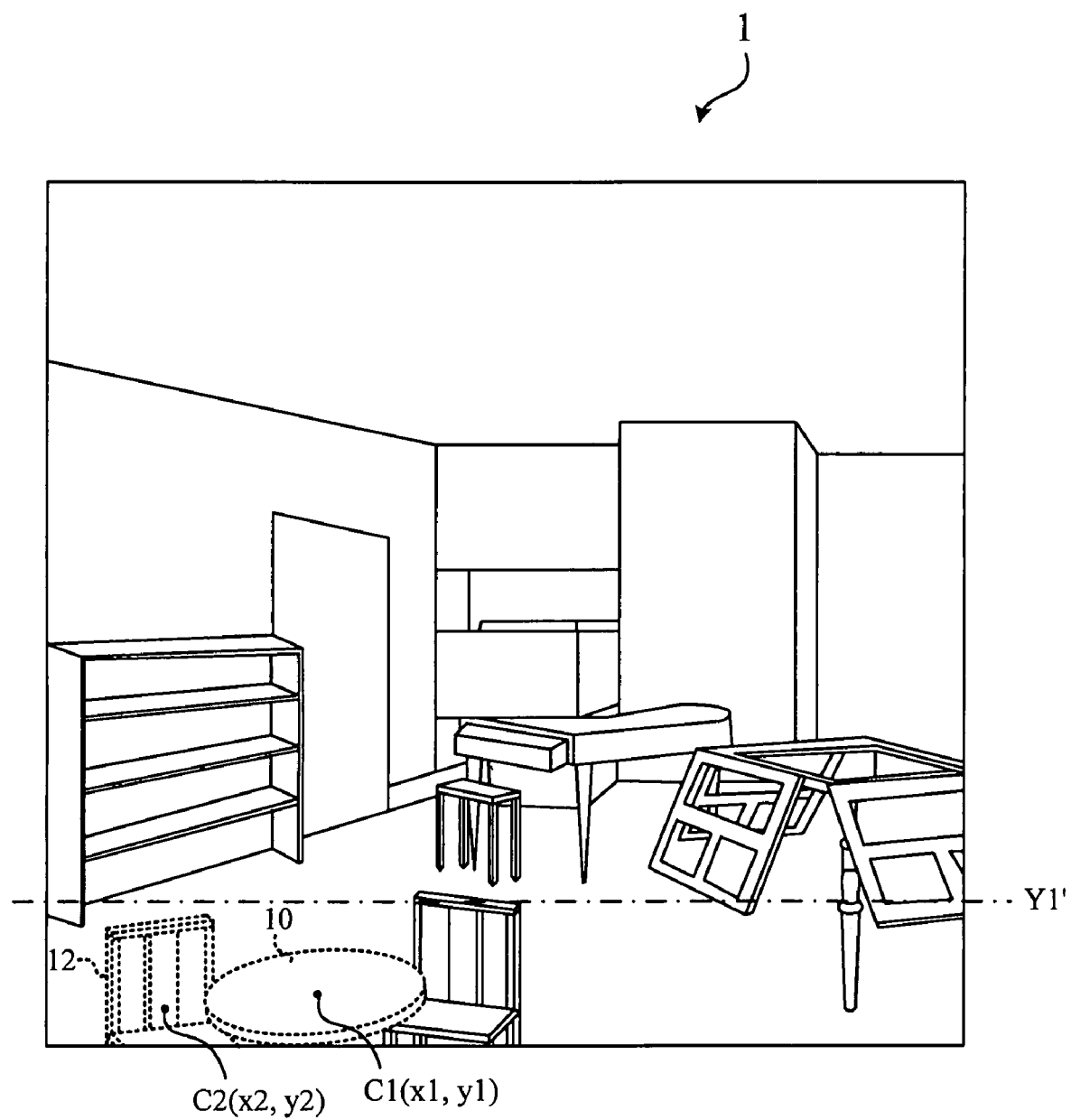
FIG. 4 is a schematic diagram illustrating that the table and the chair shown in FIG. 1 are selected.
Figure 5A:
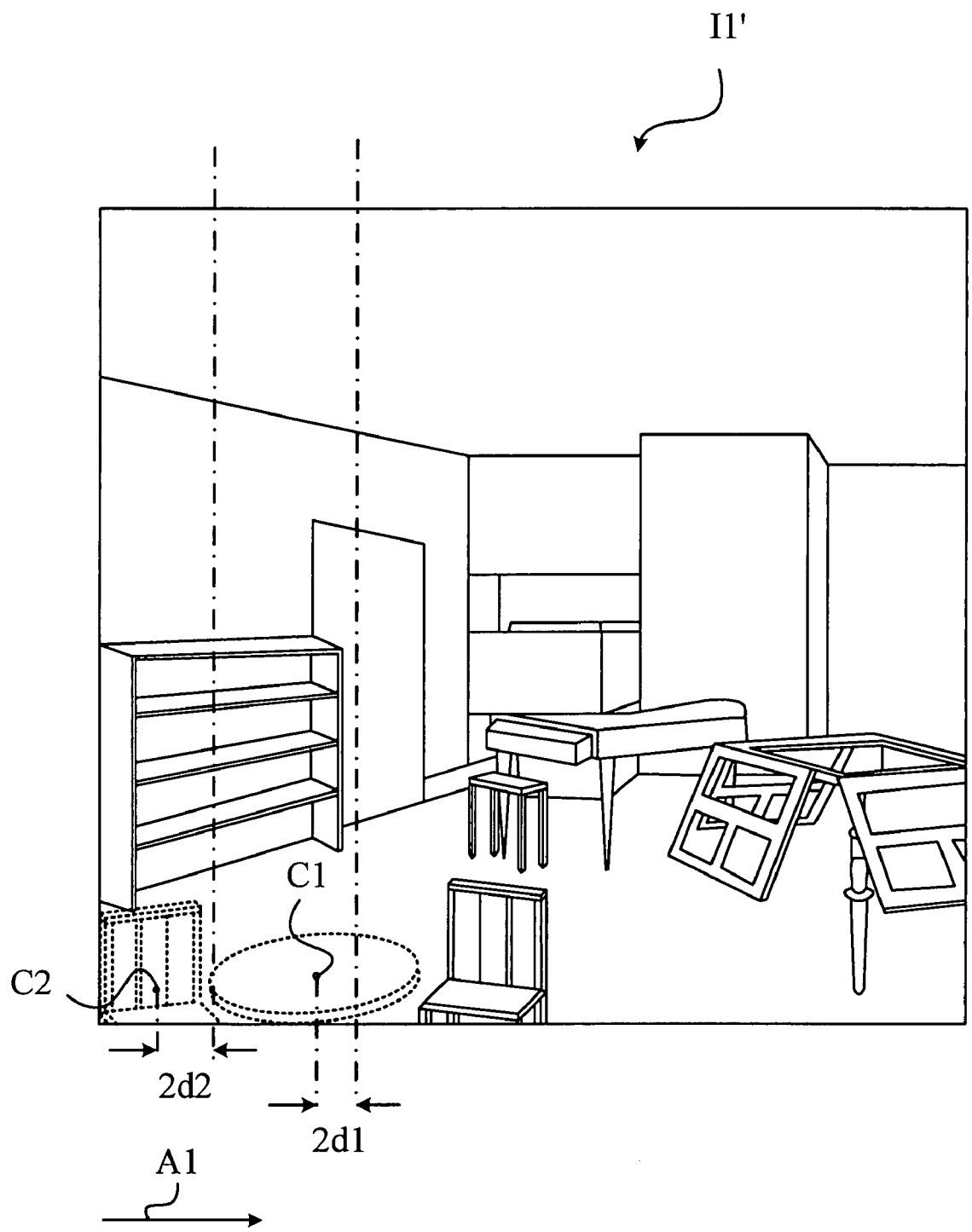
FIG. 5A to FIG. 5E are schematic diagrams illustrating five continuous images related to the table and the chair shown in FIG. 4.
Figure 5B:
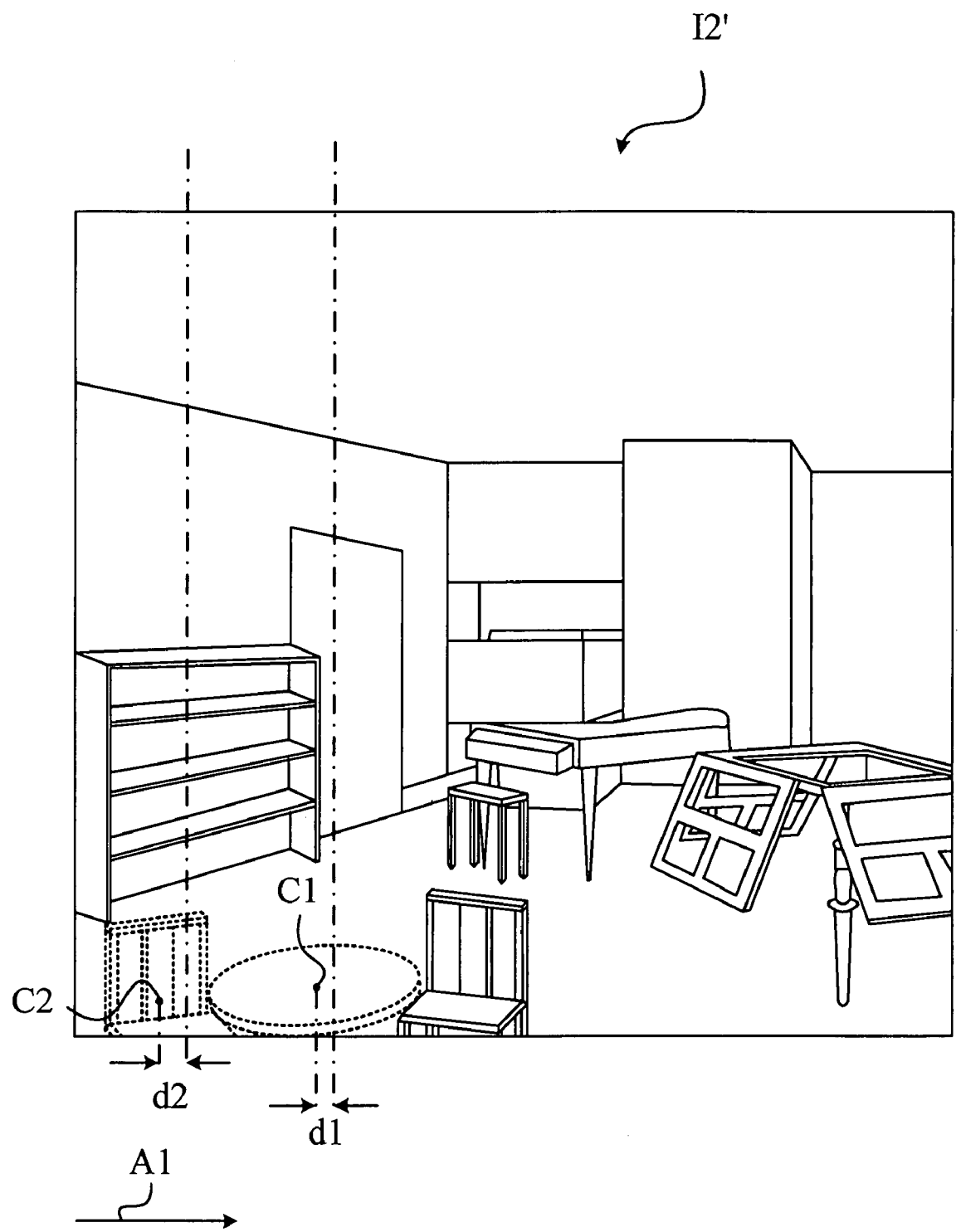
Figure 5C:
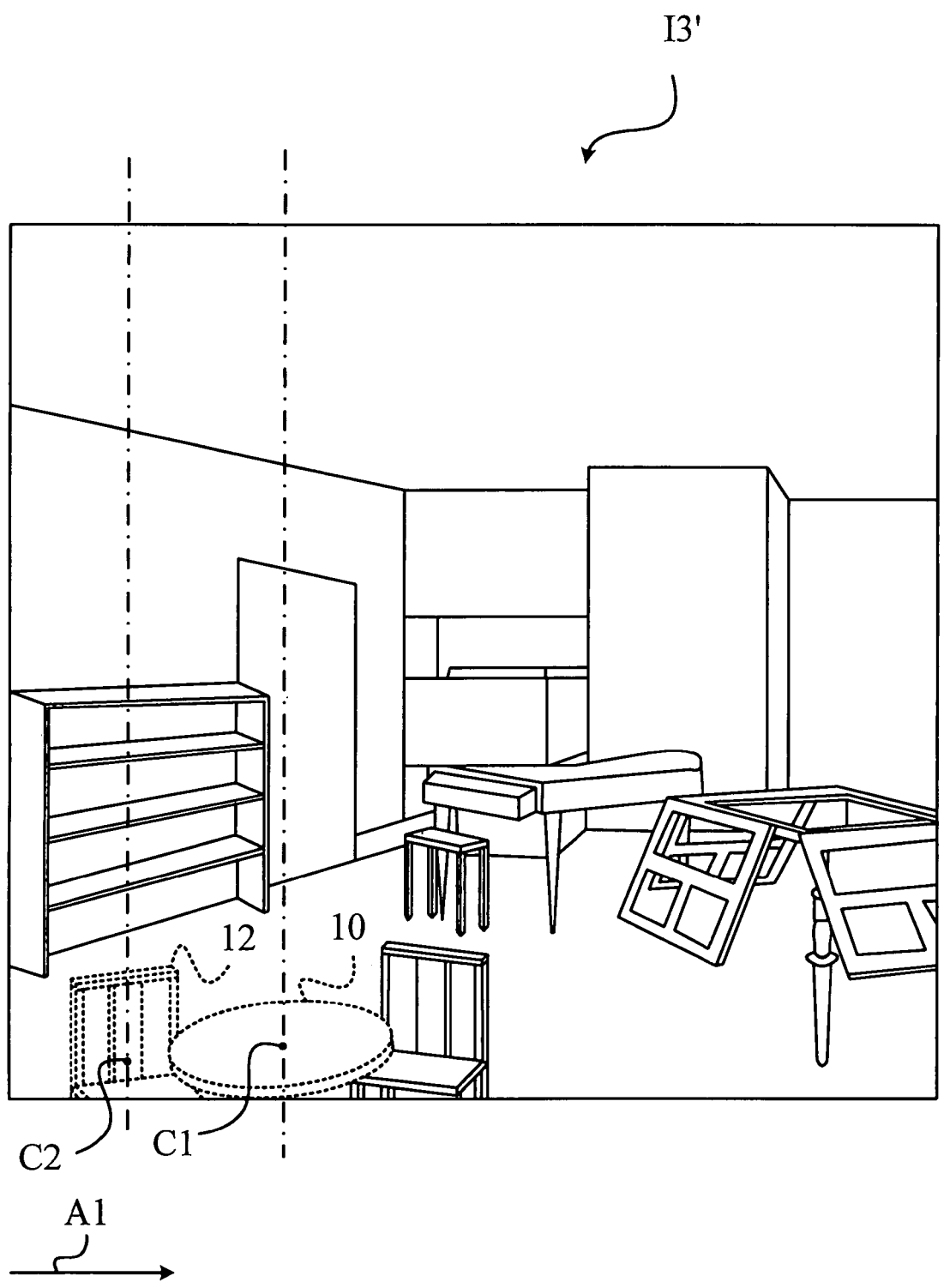
Figure 5D:
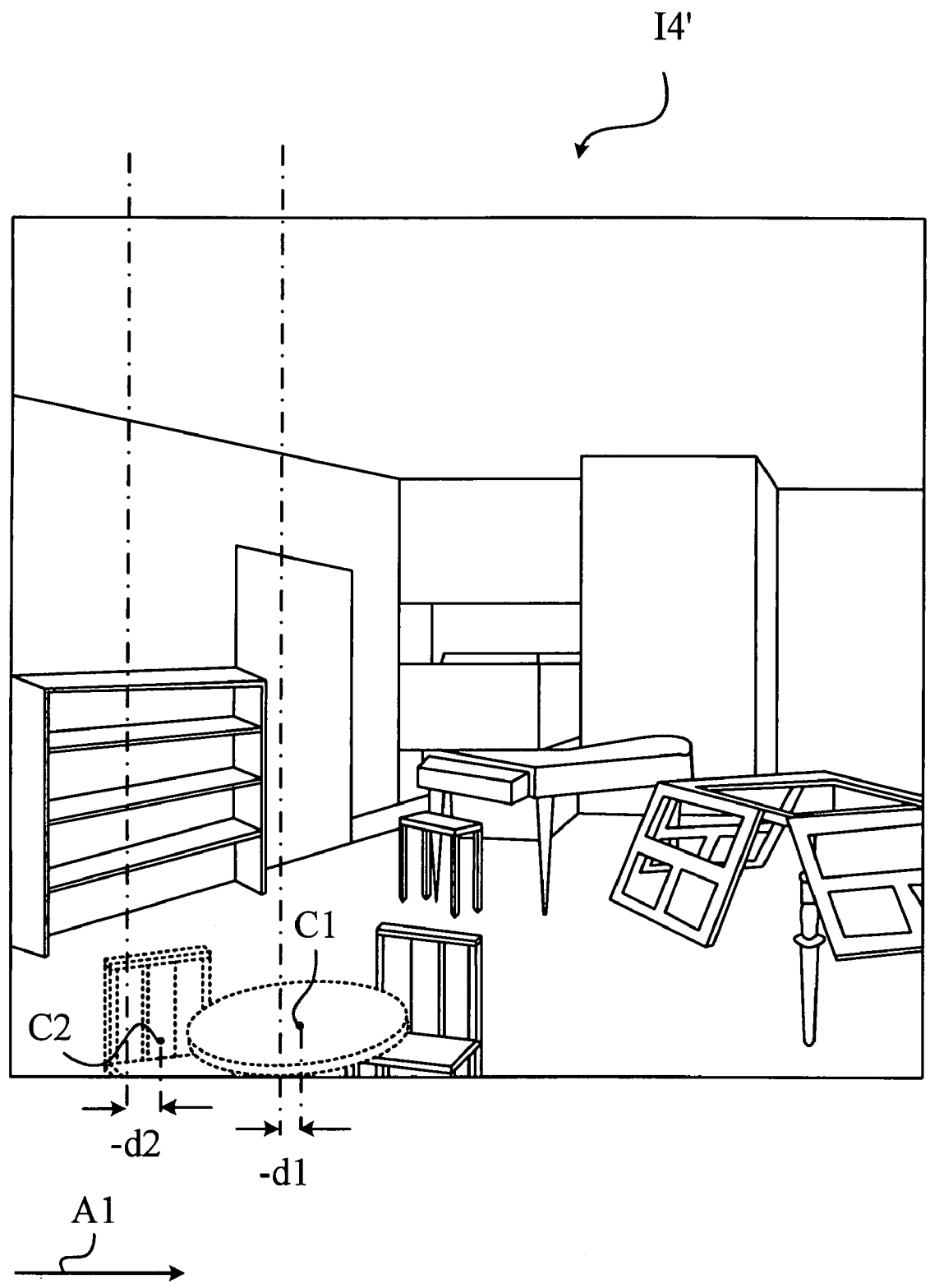
Figure 5E:
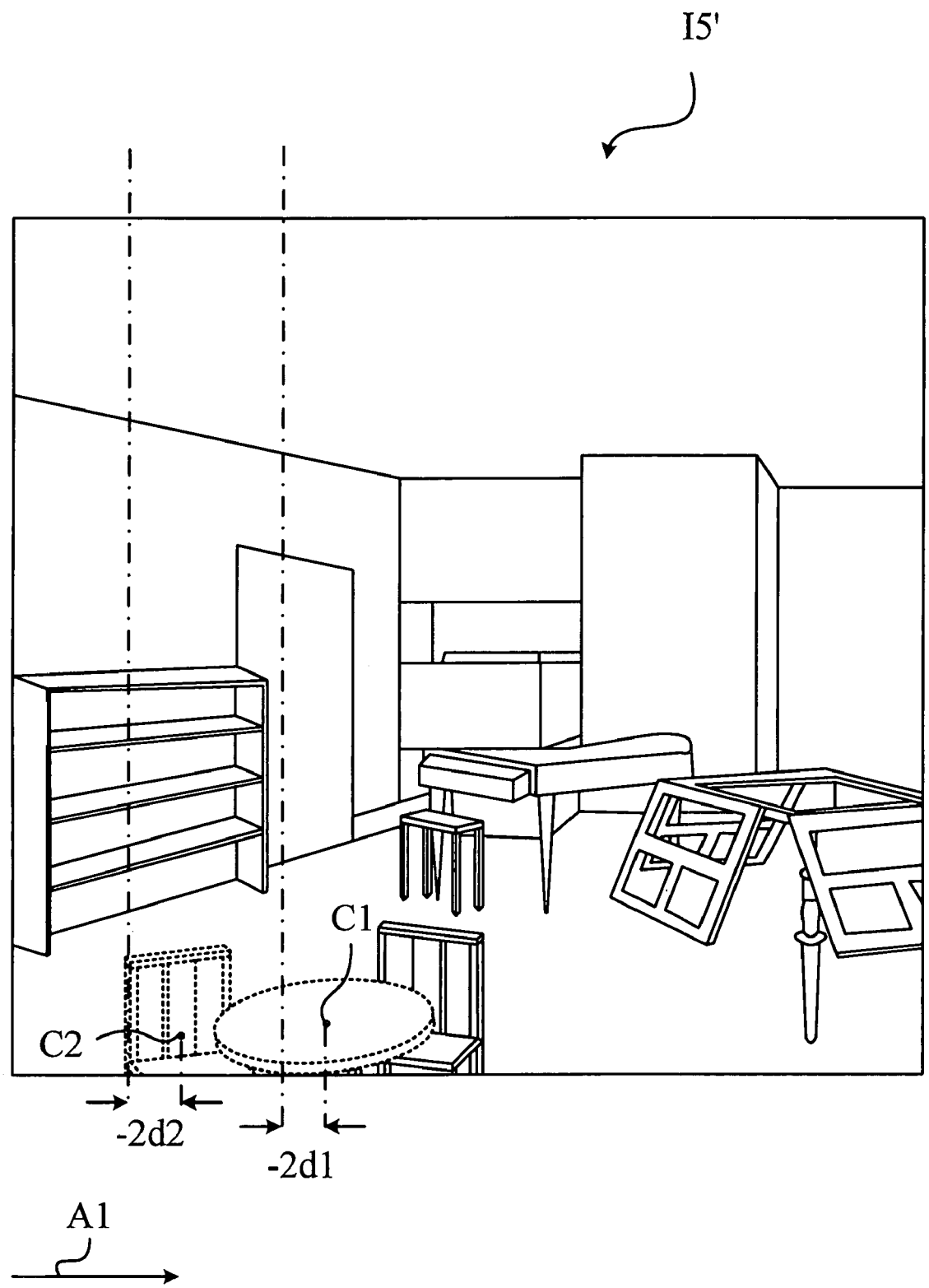

Please refer to FIG. 1 and FIG. 4 to FIG. 5E. FIG. 4 is a schematic diagram illustrating that the table 10 and the chair 12 shown in FIG. 1 are selected, and FIG. 5A to FIG. 5E are schematic diagrams illustrating five continuous images related to the table 10 and the chair 12 shown in FIG. 4.

In this embodiment, first, the user needs to select the table 10 and the chair 12 (shown by dotted line) and sets a base line Y1' in the 2D image 1. In this embodiment, the base line Y1' is a horizontal line.

Afterward, a center coordinate C1(x1, y1) of the table 10 and a center coordinate C2(x2, y2) of the chair are calculated, and according to the positions of the center coordinates C1(x1, y1) and C2(x2, y2) relative to the base line Y1', whether the table 10 and chair 12 are located on the foreground or background of the 2D image 1 is being judged. As shown in FIG. 4, because the y-coordinate y1 and y2 of the center coordinates C1 and C2 are located below the base line Y1', it is judged that the table 10 and the chair 12 are located on the foreground of the 2D image 1.

Afterward, the table 10 and the chair 12 are sorted. In this embodiment, the basis for sorting: (1) if the distance from the center coordinate of the object to the base line is longer, the object is sorted as the former; (2) if the object extends upward from a bottom (border) of the 2D image 1, the object is sorted as the former; and (3) if the distances from the center coordinates of two objects to the base line are the same, the first selected object is sorted as the former. Therefore, the chair 12 is sorted as the former to the table 10.

Afterward, a displacement d1 is offered to the table 10 and a displacement d2 is offered to the chair 12, and according to the center coordinate C1 of the table 10 and the center coordinate C2 of the chair 12, the table 10 is moved sequentially along a first direction (as the direction of arrow A1 shown in FIG. 5A to FIG. 5E) with the displacement d1 for five times and the chair 12 is moved sequentially along the first direction with the displacement d2 for five times, so as to generate five continuous images I1'-I5', as shown in FIG. 5A to FIG. 5E. Finally, each of the continuous images I1'-I5' is outputted sequentially to generate the 3D images of the table 10 and the chair 12.

Third Preferred Embodiment

The third preferred embodiment illustrates the principle of the image transforming method of the invention for transforming the 2D images of table 10 and chair 16 into 3D images.

Figure 6:
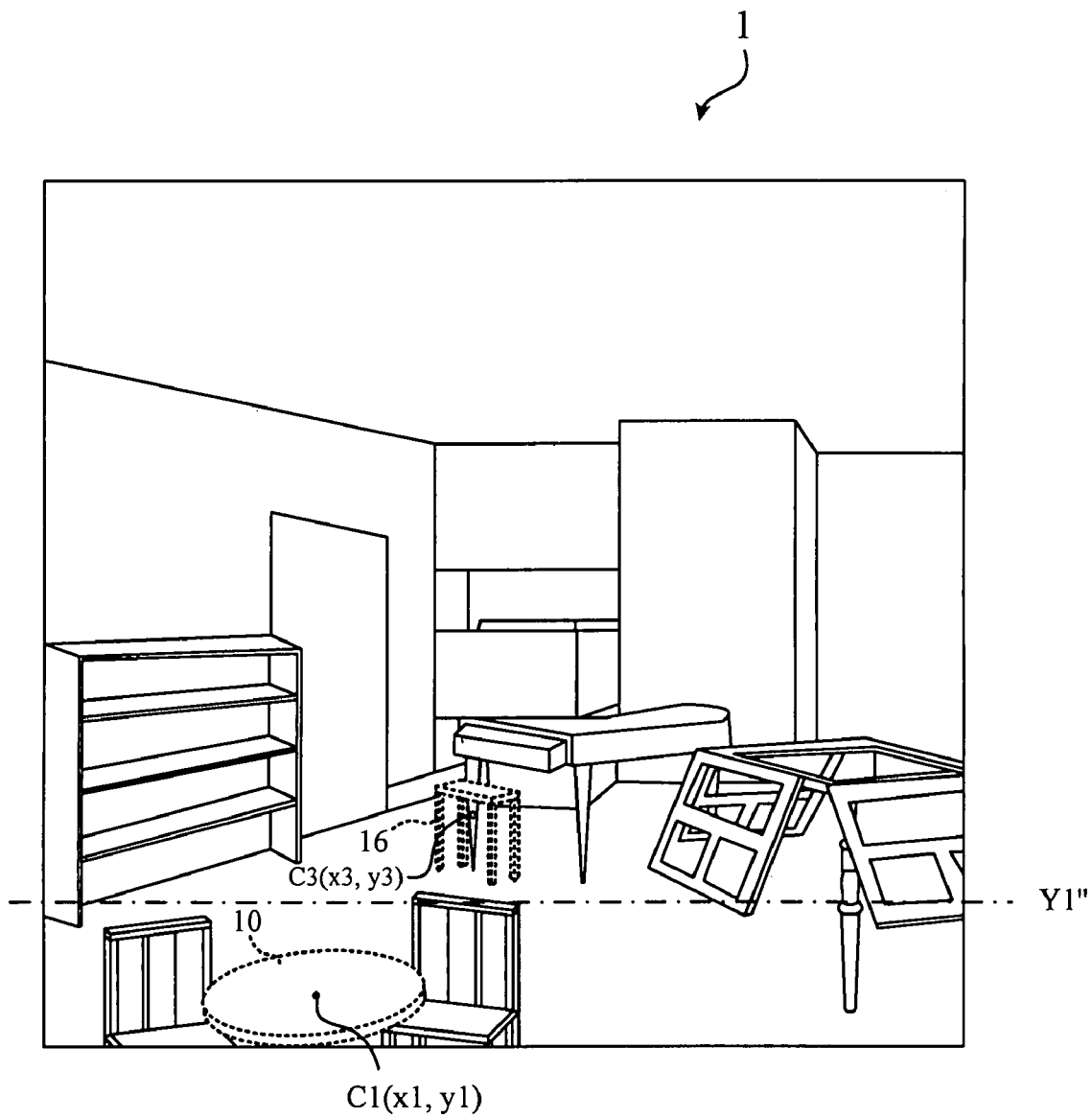
FIG. 6 is a schematic diagram illustrating that the table and the chair shown in FIG. 1 are selected.
Figure 7A:
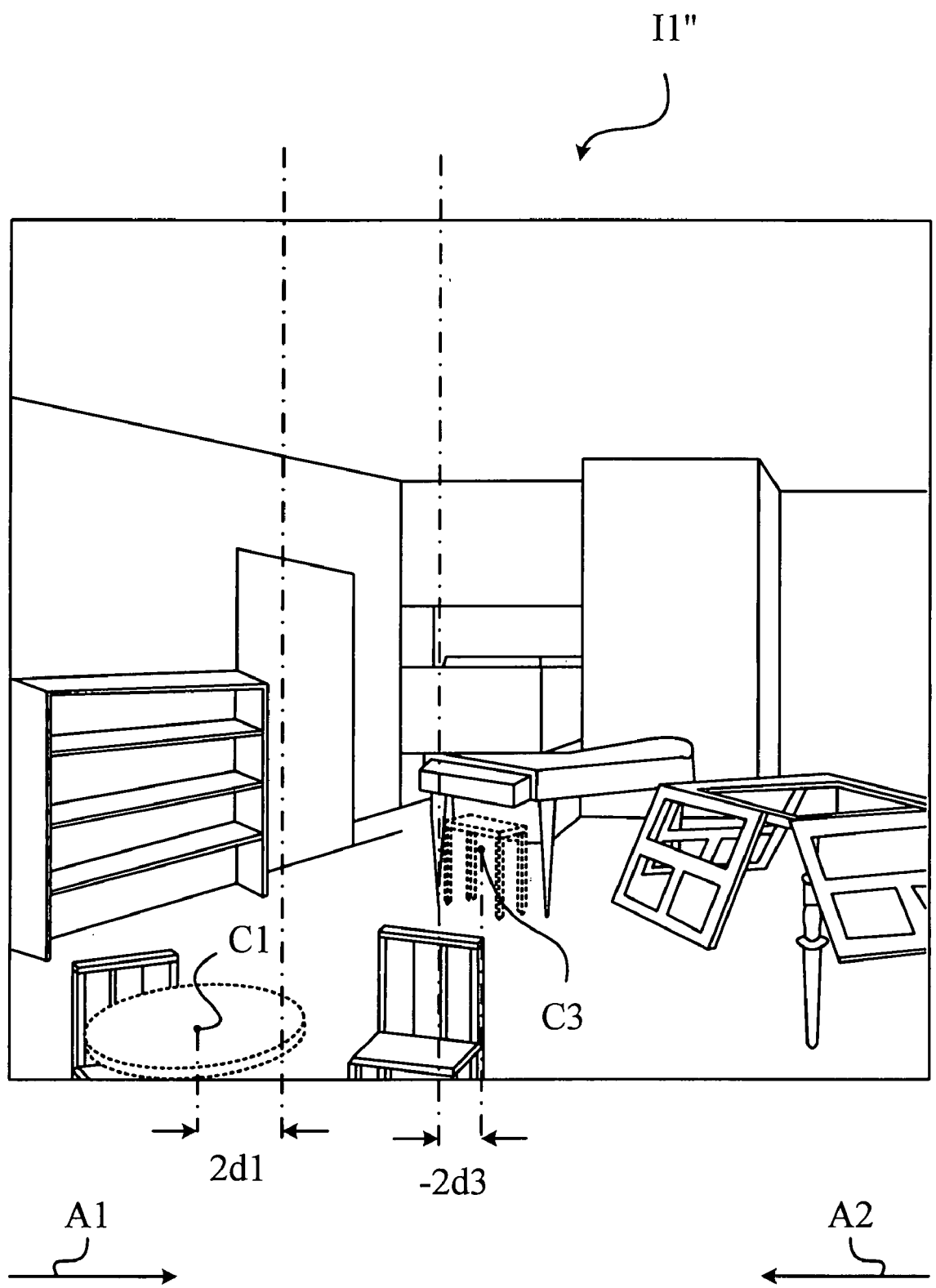
FIG. 7A to FIG. 7E are schematic diagrams illustrating five continuous images related to the table and the chair shown in FIG. 6.
Figure 7B:
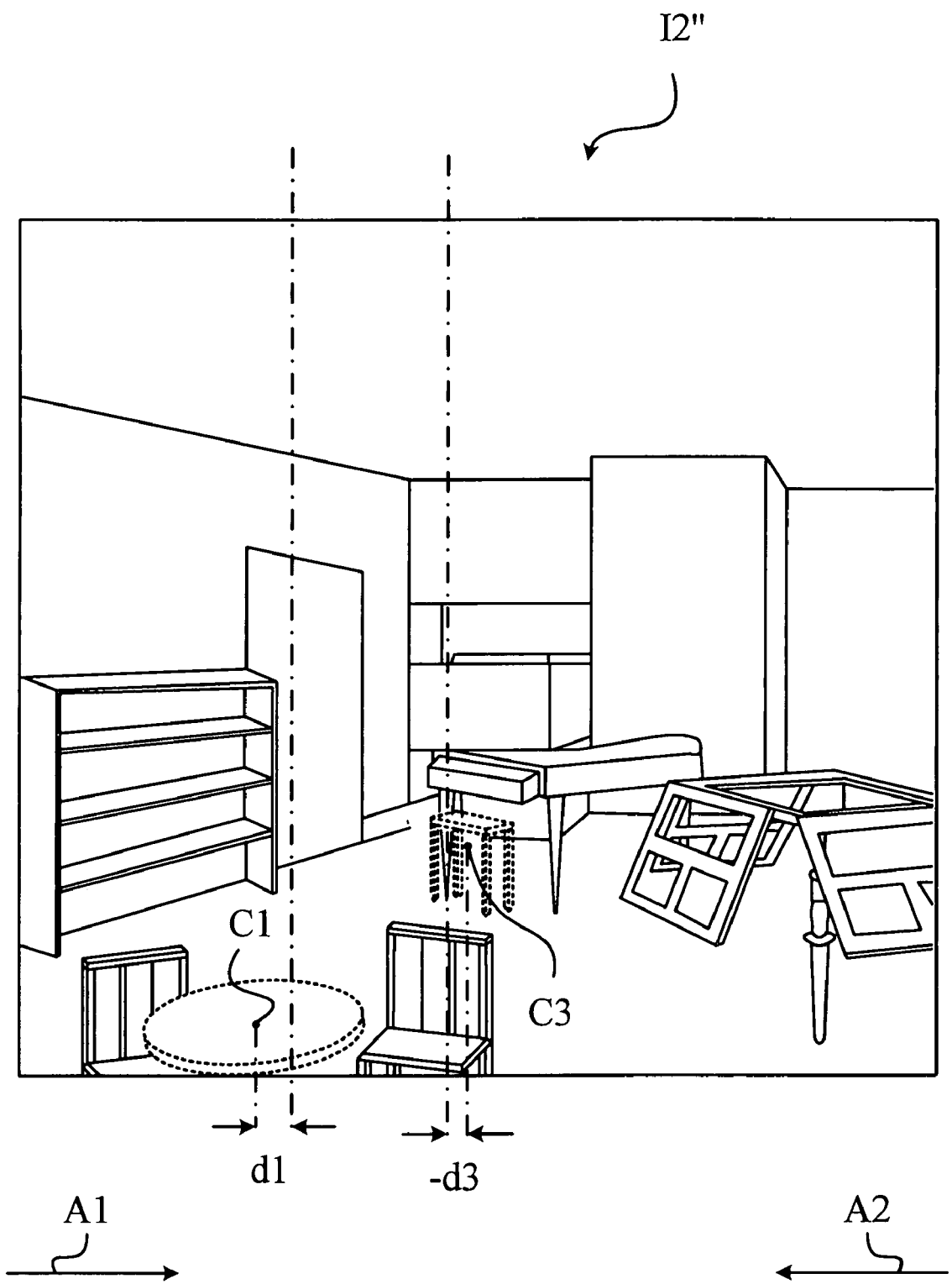
Figure 7C:
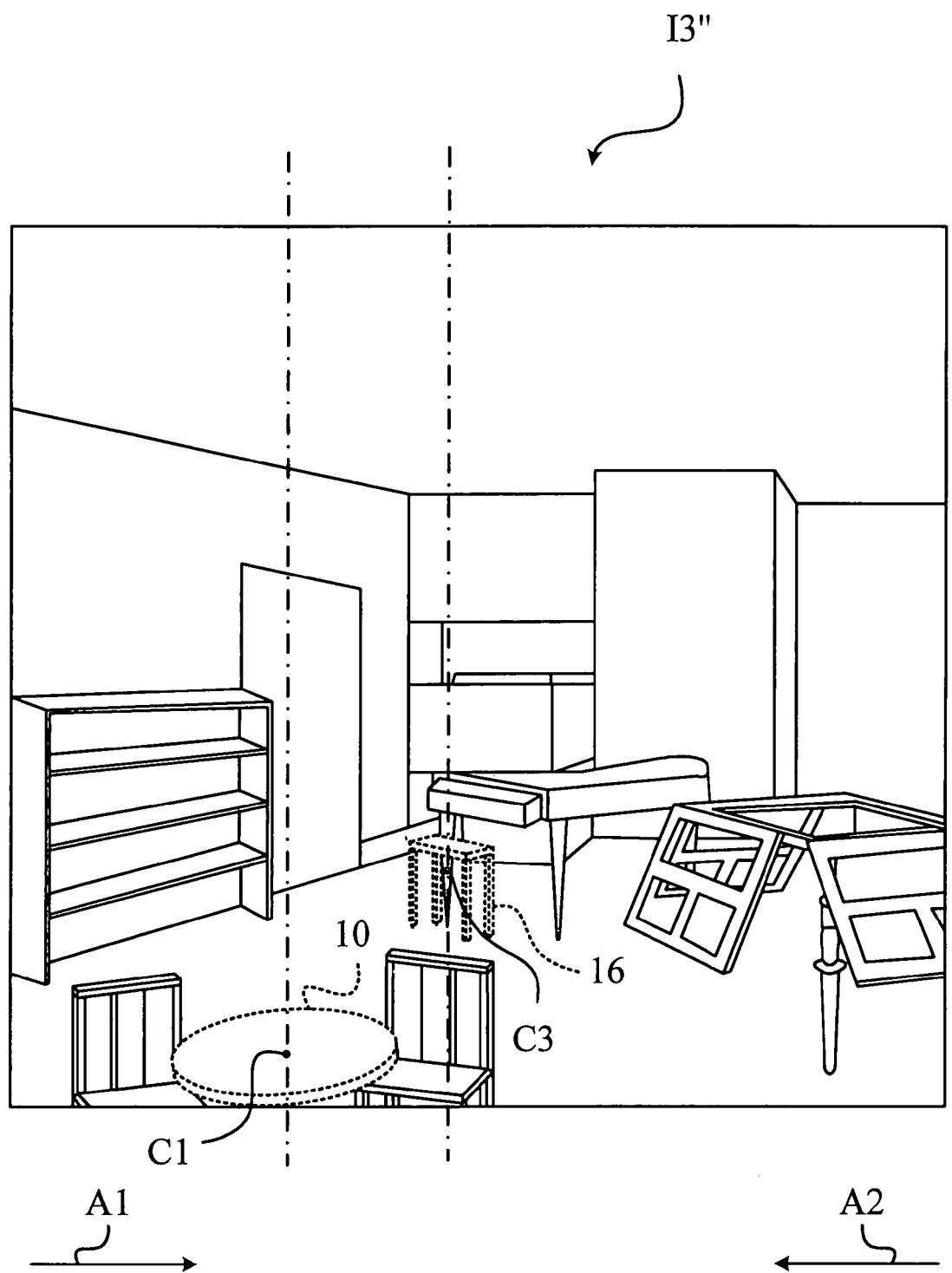
Figure 7D:
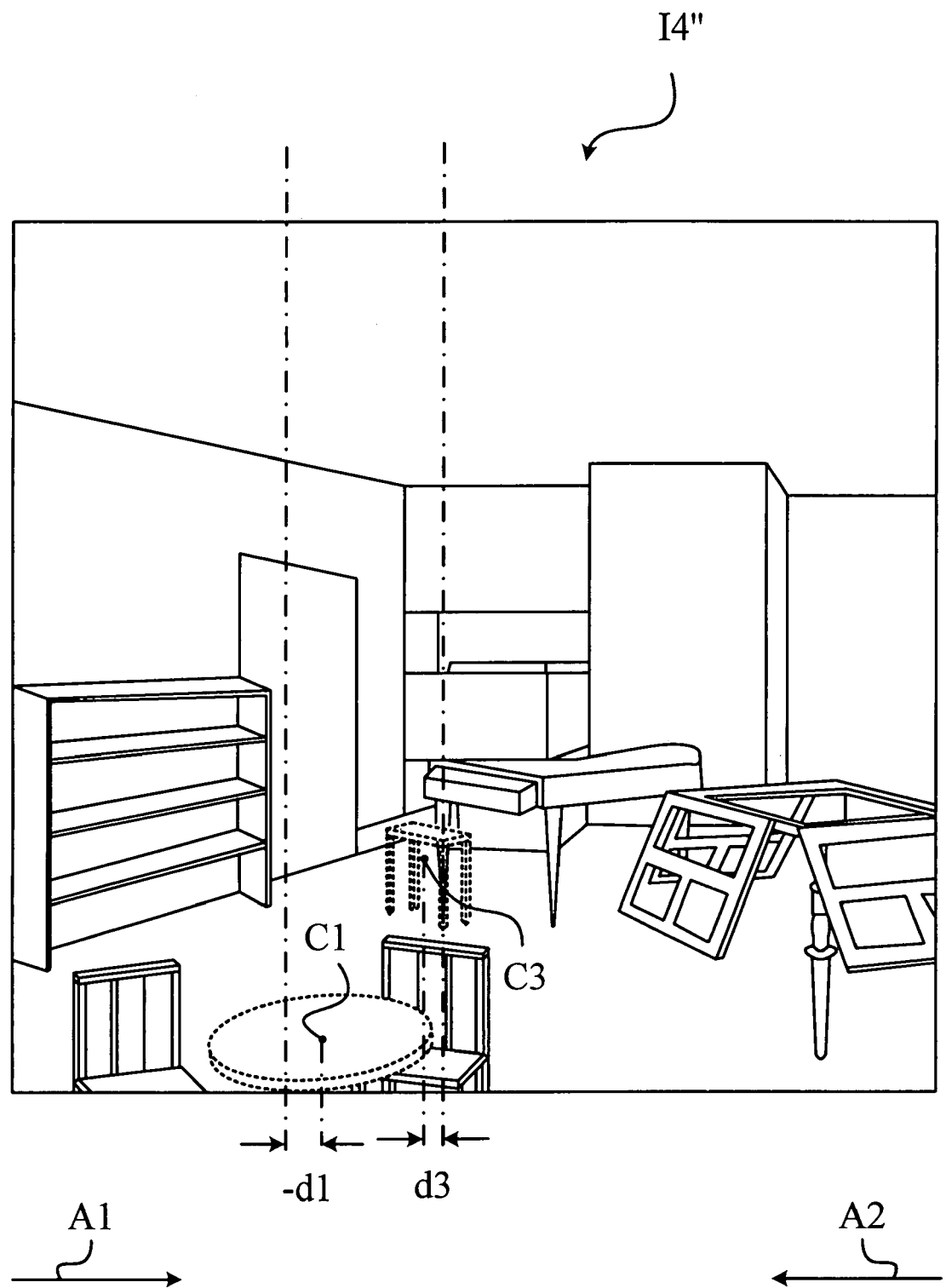
Figure 7E:
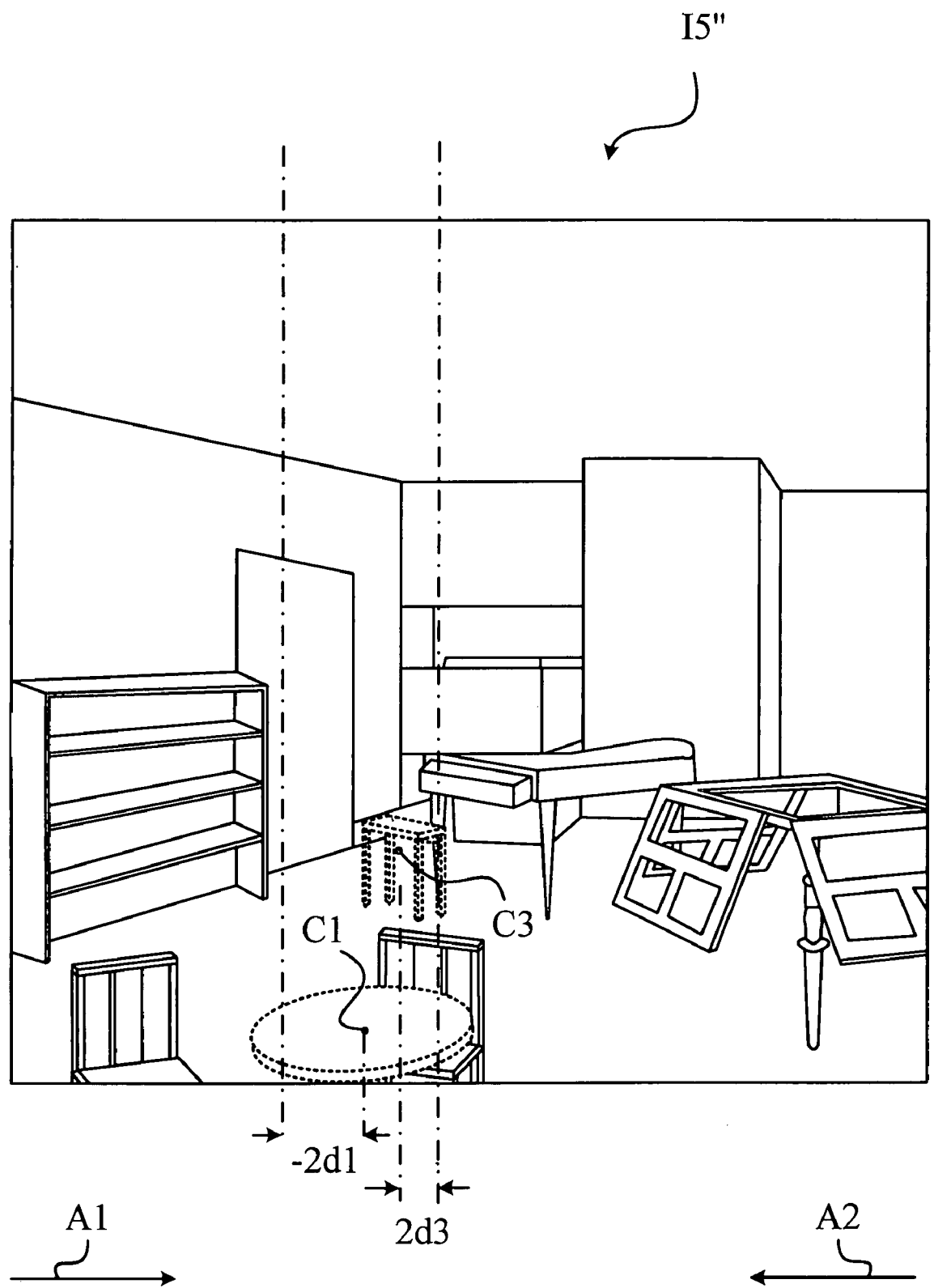

Please refer to FIG. 1 and FIG. 6 to FIG. 7E. FIG. 6 is a schematic diagram illustrating that the table 10 and the chair 16 shown in FIG. 1 are selected, and FIG. 7A to FIG. 7E are schematic diagrams illustrating five continuous images related to the table 10 and the chair 16 shown in FIG. 6.

In this embodiment, first, the user needs to select the table 10 and the chair 16 (shown by dotted line) and sets a base line Y1" in the 2D image 1. In this embodiment, the base line Y1" is a horizontal line.

Afterward, a center coordinate C1(x1, y1) of the table 10 and a center coordinate C3(x3, y3) of the chair 16 are calculated, and according to the positions of the center coordinates C1(x1, y1) and C3(x3, y3) relative to the base line Y1", whether the table 10 and chair 16 are located on the foreground or background of the 2D image 1 is being judged. As shown in FIG. 6, because the y-coordinate y1 of the center coordinate C1 is located below the base line Y1", it is judged that the table 10 is located on the foreground of the 2D image 1; because the y-coordinate y3 of the center coordinates C3 is located above the base line Y1", it is judged that the chair 16 is located on the background of the 2D image 1.

Afterward, a displacement d1 is offered to the table 10 and a displacement d3 is offered to the chair 16, and according to the center coordinate C1 of the table 10 and the center coordinate C2 of the chair 16, the table 10 is moved sequentially along a first direction (the direction of arrow A1 shown in FIG. 7A to FIG. 7E) with the displacement d1 for five times and the chair 16 is moved sequentially along a second direction (the direction of arrow A2 shown in FIG. 7A to FIG. 7E) with a displacement d3 for five times, so as to generate five continuous images I1"-I5", as shown in FIG. 7A to FIG. 7E. Finally, each of the continuous images I1"-I5" is outputted sequentially to generate the 3D images of the table 10 and the chair 16. The first direction is opposite to the second direction.

It should be noted that the said displacements and the number of the continuous images produced at the last step are capable of being designed by the designer according to particular applications. Accordingly, the invention is capable of being applied to various 3D displays, such as a slanted lenticular, a straight lenticular, a light polarizing plate, and the like. If the 3D displays are in the form of the light polarizing plates, only two continuous images need to be generated in the end.

Compared to the prior art, where after a user selects objects in 2D image, the method of the invention can transform a 2D image into a 3D image. It is very convenient for the users.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for transforming a 2D image into a 3D image, comprising steps of:
   (a) selecting at least one object of the 2D image by an electronic apparatus;
   (b) setting a base line in the 2D image by the electronic apparatus;
   (c) calculating a center coordinate of each object and base on the base line, judging whether each object is located on a foreground or a background of the 2D image by the electronic apparatus, wherein N first objects are located on the foreground and M second objects are located on the background, N and M are integers greater than or equal to zero but are not equal to zero at the same time;
   (d) sorting each of the N first objects and each of the M second objects respectively by the electronic apparatus;
   (e) according to the sort of the N first objects, offering a first displacement to each of the N first objects by the electronic apparatus, and according to the sort of the M second objects, offering a second displacement to each of the M second objects by the electronic apparatus;

(f) moving each of the N first objects with the first displacement and moving each of the M second objects with the second displacement to generate T continuous images by the electronic apparatus, T being a natural number; and (g) sequentially outputting each of the T continuous images to generate the 3D image by the electronic apparatus.

2. The method of claim 1, wherein the step (c) further comprises a step of:

(c1) according to a position of the center coordinate of each object relative to the base line, judging whether each object is located on the foreground or background of the 2D image by the electronic apparatus.

3. The method of claim 2, wherein in the step (d), if a distance from the center coordinate of one of the at least one object to the base line is longer than the others, the object is sorted by the electronic apparatus as the former.

4. The method of claim 3, wherein in the step (d), if one of the at least one object extends upward from a bottom of the 2D image, the object is sorted by the electronic apparatus as the former.

5. The method of claim 4, wherein in the step (d), if the distances from the center coordinates of two objects to the base line are the same, the firstly selected object is sorted by the electronic apparatus as the former.

6. The method of claim 2, in the step (f), according to the center coordinate of each of the N first object, sequentially moving the first object along a first direction with the first displacement for T times by the electronic apparatus and, according to the center coordinate of each of the M second object, sequentially moving the second object along a second direction with the second displacement for T times the electronic apparatus, so as to generate the T continuous images by the electronic apparatus, wherein the first direction is opposite to the second direction.

7. The method of claim 1, wherein the base line is a horizontal line.

8. A method for transforming a 2D image into a 3D image, comprising steps of:

(a) selecting an object of the 2D image by an electronic apparatus;

(b) setting a base line in the 2D image by the electronic apparatus;

(c) calculating a center coordinate of each object and base on the base line, judging whether the object is located on a foreground or a background of the 2D image by the electronic apparatus;

(d) offering a displacement to the object by the electronic apparatus;

(e) moving the object with the displacement to generate T continuous images by the electronic apparatus, T being a natural number; and (f) sequentially outputting each of the T continuous images to generate the 3D image by the electronic apparatus.

9. The method of claim 8, wherein the step (c) further comprises a step of:

(c1) according to a position of the center coordinate of the object relative to the base line, judging whether the object is located on the foreground or the background of the 2D image by the electronic apparatus.

10. The method of claim 9, in the step (e), if the object is located on the foreground of the 2D image, according to the center coordinate of the object, sequentially moving the object along a first direction with the displacement for T times to generate the T continuous images by the electronic apparatus; if the object is located on the background of the 2D image, according to the center coordinate of the object, sequentially moving the object along a second direction with the displacement for T times to generate the T continuous images by the electronic apparatus, wherein the first direction is opposite to the second direction.

11. The method of claim 8, wherein the base line is a horizontal line.

* * * * *